United States Patent
Chatras et al.

(10) Patent No.: US 9,918,214 B2
(45) Date of Patent: Mar. 13, 2018

(54) METHODS FOR APPLYING SESSION-PROCESSING RULES IN ACCORDANCE WITH A PRESENCE MAP OF MOBILE TERMINALS IN SPECIAL AREAS

(71) Applicant: Orange, Paris (FR)

(72) Inventors: Bruno Chatras, Paris (FR); Ali-Amine Mouafik, Boulogne (FR); Jean Luc Garcia, Meudon (FR)

(73) Assignee: ORANGE, Paris (FR)

( * ) Notice: Subject to any disclaimer, the term of this patent is extended or adjusted under 35 U.S.C. 154(b) by 3 days.

(21) Appl. No.: 14/388,684

(22) PCT Filed: Mar. 27, 2013

(86) PCT No.: PCT/FR2013/050659
§ 371 (c)(1),
(2) Date: Sep. 26, 2014

(87) PCT Pub. No.: WO2013/144505
PCT Pub. Date: Oct. 3, 2013

(65) Prior Publication Data
US 2015/0049648 A1    Feb. 19, 2015

(30) Foreign Application Priority Data
Mar. 30, 2012   (FR) ..................... 12 52918

(51) Int. Cl.
*H04L 12/16*    (2006.01)
*H04Q 11/00*    (2006.01)
(Continued)

(52) U.S. Cl.
CPC ......... *H04W 8/005* (2013.01); *H04L 12/1407* (2013.01); *H04L 41/0893* (2013.01);
(Continued)

(58) Field of Classification Search
CPC ..... H04W 8/005; H04W 4/021; H04W 64/00; H04L 12/1407; H04L 41/0893; H04M 15/66
See application file for complete search history.

(56) References Cited

U.S. PATENT DOCUMENTS

2006/0176815 A1 *  8/2006  Picot ..................... H04W 28/22
                                                              370/235
2008/0009313 A1 *  1/2008  Ishii ...................... H04L 63/102
                                                              455/556.1
(Continued)

FOREIGN PATENT DOCUMENTS

EP        2424317 A1     2/2012
WO    2007147142 A2    12/2007

OTHER PUBLICATIONS

3GPP (3rd Generation Partnership Project) standard from Version 8 finalized in Dec. 2008.
(Continued)

*Primary Examiner* — Lonnie Sweet
(74) *Attorney, Agent, or Firm* — David D. Brush; Westman Champlin & Koehler, P.A

(57) ABSTRACT

A method for transmitting a presence map of mobile terminals connected via a communication session to a mobile network covering a plurality of location areas. The method includes: obtaining information relating to existence of at least one special area from among the plurality of location areas and with which a special session-processing rule is associated; iteratively updating a presence map associating location area identifiers with terminal identifiers, including: collecting location information of a terminal, including a location area identifier of the terminal; searching the area information for existence of a special area that corresponds to the location area; and, when the special area exists, adding the terminal identifier and the location area identifier to the
(Continued)

Figure 1:
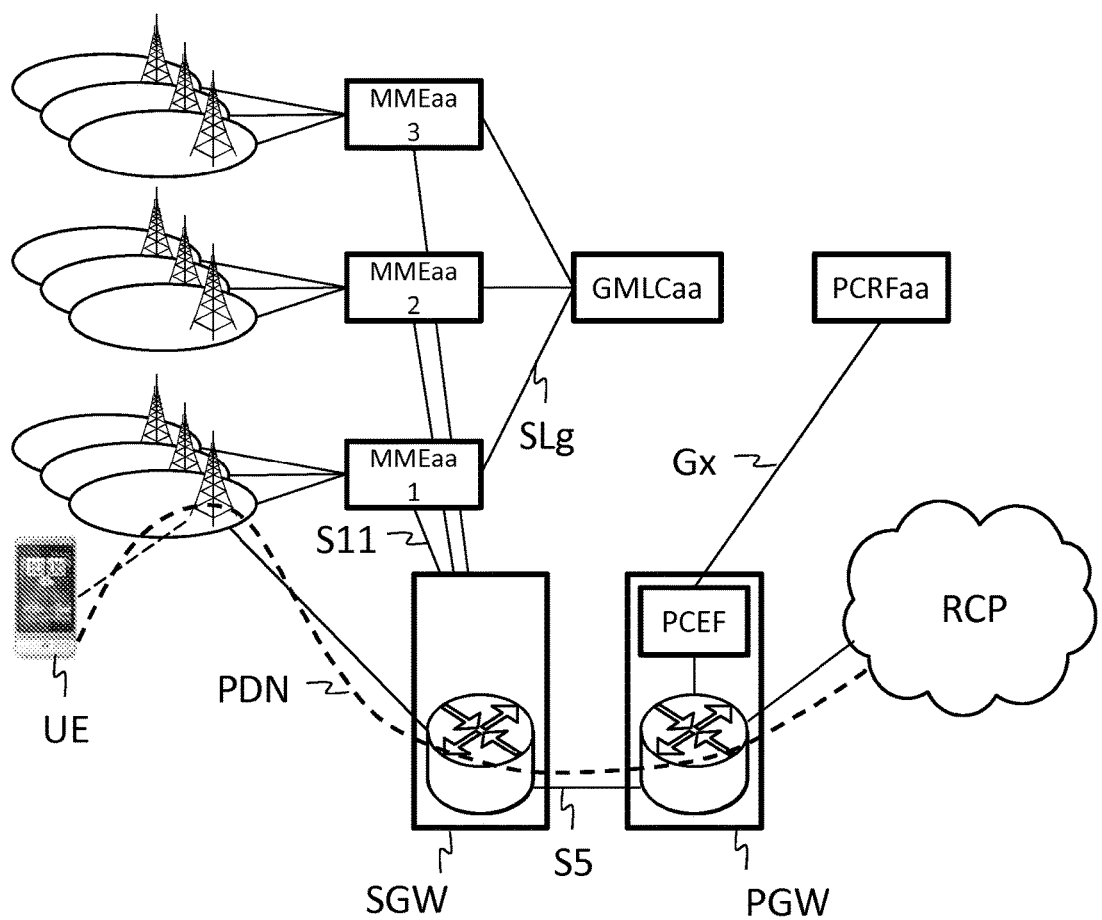

terminal presence map; and transmitting the terminal presence map to a device of the mobile network capable of applying a session-processing rule to a terminal in accordance with at least the location area thereof.

9 Claims, 6 Drawing Sheets

(51) Int. Cl.

| | | |
|---|---|---|
| *H04W 8/00* | (2009.01) | |
| *H04L 12/14* | (2006.01) | |
| *H04W 4/24* | (2018.01) | |
| *H04L 12/24* | (2006.01) | |
| *H04M 15/00* | (2006.01) | |
| *H04W 4/02* | (2018.01) | |
| *H04W 24/02* | (2009.01) | |
| *H04W 64/00* | (2009.01) | |

(52) U.S. Cl.
CPC ........... *H04M 15/66* (2013.01); *H04W 4/021* (2013.01); *H04W 4/24* (2013.01); *H04W 24/02* (2013.01); *H04W 64/00* (2013.01)

(56) References Cited

U.S. PATENT DOCUMENTS

| | | | |
|---|---|---|---|
| 2008/0299943 A1* | 12/2008 | Jacobson | G01S 5/0009 455/406 |
| 2009/0254494 A1 | 10/2009 | Li et al. | |
| 2010/0223222 A1* | 9/2010 | Zhou | H04L 12/14 706/47 |
| 2011/0201303 A1 | 8/2011 | Cutler et al. | |
| 2012/0026947 A1* | 2/2012 | Miller | H04L 63/104 370/329 |

OTHER PUBLICATIONS

International Preliminary Report on Patentability and English translation of the Written Opinion dated Oct. 1, 2014 for corresponding International Application No. PCT/FR2013/050659, filed Mar. 27, 2013.

International Search Report and Written Opinion dated May 16, 2013 for corresponding International Patent Application No. PCT/FR2013/050659, filed Mar. 27, 2013.

French Search Report and Written Opinion dated Sep. 28, 2012 for corresponding French Patent Application No. 1252918, filed Mar. 30, 2012.

\* cited by examiner

METHODS FOR APPLYING SESSION-PROCESSING RULES IN ACCORDANCE WITH A PRESENCE MAP OF MOBILE TERMINALS IN SPECIAL AREAS

1. CROSS-REFERENCE TO RELATED APPLICATIONS

This application is a Section 371 National Stage Application of International Application No. PCT/FR2013/050659, filed Mar. 27, 2013, the content of which is incorporated herein by reference in its entirety, and published as WO 2013/144505 on Oct. 3, 2013, not in English.

2. FIELD OF THE INVENTION

The field of the invention is that of the management of communication sessions between a mobile terminal and a packet switching network, across a mobile network, and more particularly that of the management of the monitoring of quality of service parameters and charging rules applied to the communication sessions in accordance with the location of the terminals.

3. PRIOR ART

In mobile networks according to the 3GPP (3rd Generation Partnership Project) standard from Version 8 finalized in December 2008, particularly according to the TS 23.203 specification, it is possible to modify the quality of service parameters and the charging rules applied to an existing communication session as a function of terminal location data.

The signaling messages exchanged between the various entities of the mobile network indicate the location of the user terminal, each time the latter changes.

Thus, a modification of the quality of service (for example the allocated bandwidth, or priority), or a modification of the charging can be decided in real time, as a function of events including a change in the location of the user terminal.

Several levels of granularity of location areas exist. The finest level of granularity is the area covered by the radiation of a relay antenna, called a cell. Another level is that of the "tracking area", which groups together one or more cells in the configuration determined by the operator.

Whatever the level of granularity chosen for the triggering of the signaling messages related to the tracking of the location of the users, if the notification of a change of location was activated for all the users of the mobile network, this would inevitably lead to heavy signaling traffic over the various interfaces and appliances in the architecture, a traffic that only a redimensioning of the network could meet.

Moreover, there is no prior correlation between the signaling related to a change of location, and the need to modify the communication session. Indeed, in a mobile network, many, if not the majority, of location areas share the same quality of service or charging characteristics. A large part of the signaling generated in relation to the changes of location of the terminals is therefore pointless in reality.

There is a need for a solution for modifying in real time the quality of service parameters or the charging rules of a communication session as a function of the location of the user, which does not have these drawbacks.

4. DISCLOSURE OF THE INVENTION

The invention comes to improve the situation using a method for transmitting a presence map of mobile terminals connected to a mobile network covering a plurality of location areas, implemented by an appliance of the mobile network capable of collecting items of information about the location of mobile terminals, the method comprising:

a prior step of obtaining an item of so-called area information, comprising at least one item of information related to the existence of at least one area among the plurality of location areas, called a special area, with which a special session-processing rule is associated, at least one iterative step of updating a terminal presence map associating location area identifiers with terminal identifiers, the step comprising the following steps:

collecting an item of terminal location information, comprising a location area identifier of this terminal, searching, in the item of area information, for the existence of a special area corresponding to the identifier of said location area, and, when the special area exists, adding the terminal identifier and the location area identifier to the terminal presence map, and a step of transmitting the terminal presence map to an appliance of the mobile network capable of applying a session-processing rule to a terminal according to at least its location area.

Thanks to the prior obtaining of the item of area information, the method gains knowledge of the areas, called special areas, for which it is for example possible, or desirable, to apply to a terminal a different session-processing rule according to its location (quality of service, or charging). The list of the special areas is included in the item of area information. The item of area information can also indicate that no special area exists.

Once the item of area information has been obtained, the method undertakes an iterative updating of a presence map. The role of the presence map is to indicate which terminals are present in each of the special areas. Each time an item of location information is collected, the knowledge of the item of area information makes it possible to determine whether this item of location information is relevant from the point of view of the application of a session-processing rule to the terminals. When the collected item of location information of a terminal indicates that it is found in a special area, the terminal identifier and the identifier of the area in question are added to the presence map, or the terminal identifier is added to a list in the presence map corresponding to the area identifier, according to the format of presence map used. Otherwise, the item of location information is ignored.

With the invention, it is only at the end of the iterative updating of the presence map that it is transmitted. According to the prior technique, on the other hand, each step of collecting an item of location information gave rise to a step of transmitting a corresponding item of information.

It will be understood that with the invention, an item of location information does not translate into the corresponding sending of an item of location information, because only the relevant items of information resulting from the collected items of location information will be preserved, then grouped together before a step of transmitting the presence map. The invention therefore allows a reduction in the number of sent messages related to the changes of location of the terminals, and therefore a reduction in the volume of signaling exchanged in the network.

The invention therefore proposes a new and inventive approach to the management of signaling related to the changes of location of a mobile terminal, which consists in filtering out the information that is not relevant for the application of a session-processing rule to the terminals, and in grouping together the relevant items of information in a presence map.

This method for transmitting a map can be implemented by an appliance of the mobile network capable of managing the mobility of the terminals, such as a central appliance for locating mobile terminals GMLC (Gateway Mobile Location Center, according to the 3GPP standard) or an entity for managing mobility MME (Mobility Management Entity, according to the 3GPP standard). A GMLC is connected to all the MMEs and is therefore able to manage the mobility of the terminals in a centralized way.

According to one aspect of the invention, the first step of collecting an item of terminal location information is preceded by a step of sending a request to subscribe to the items of terminal location information.

So that the appliance capable of collecting items of terminal location information can receive these information items, it may have to request beforehand to be the recipient of this information. In this way the items of location information are only transmitted by the network when they are used.

According to another aspect of the invention, the step of transmitting the presence map is followed by a step of sending a request to unsubscribe from the items of terminal location information.

So that the appliance capable of collecting items of terminal location information can stop receiving them when this is no longer useful, for example when there are no more special areas, it can request to stop receiving these information items. This avoids having to encumber the network with transmissions of items of location information that will not be used.

According to one aspect of the invention, if the presence map is too voluminous to be transmitted in a single message, it can be divided and transmitted piecewise.

According to one aspect of the method for transmitting a presence map, the item of area information comprises an element belonging to the group comprising:

no special area identifier,
at least one special area identifier.

In other words, the item of area information can contain zero, one or more location area identifiers corresponding to special areas. The item of area information can indeed contain no special area identifier, for example when there are no more areas for which it is possible, or desirable, to apply to a terminal a different session-processing rule according to its location (quality of service, or charging). In this particular case where the item of area information contains an item of information indicating that no special area exists, none of the iterative updating steps translates into an addition to the presence map. The presence map is therefore in this case transmitted "void", i.e. without any terminal identifier, which has the advantage of indicating to an appliance capable of applying a session-processing rule to a terminal according to its location area that the "void" item of area information has indeed been taken into account. When the item of area information is "void" it is indeed preferable to transmit a "void" presence map rather than not transmitting any map, because the latter alternative involves uncertainty regarding the cause of the non-transmission, which can also be due to a signaling malfunction.

According to one aspect of the invention, the step of obtaining the item of area information is followed by a step of translating the identifiers of special areas.

In general, the identifiers included in the item of area information and the identifiers included in the items of location information share the same system for numbering areas. But in certain cases two different numbering systems are used. For example, the item of area information can use area identifiers specific to the type of mobile network, such as LAI (Location Area Identity) for GSM networks, TAI (Tracking Area Identity) for LTE networks, or else geographical names or geographical coordinates. For its part, the item of terminal location information can use identifiers of cells of the mobile network (called Cell Ids). In cases where the numbering systems are different, the method carries out a translation of the identifiers from one system to the other.

According to one aspect of the method for transmitting a presence map, the step of transmitting the presence map is periodic, the duration of the period being included in the item of area information.

The appliance transmitting the presence map, capable of collecting items of terminal location information, transmits the map at the end of a period called the updating period, including a certain number of iterative steps of updating the presence map. The duration of this updating period has an effect on the appliance receiving the presence map, which is an appliance capable of applying a session-processing rule to the terminals, and which must be able to track the mobility of the terminals with a certain degree of accuracy, depending on the time that passes between two transmissions of the presence map, i.e. precisely, depending on the duration of the updating period. Advantageously, the fact that the duration of this updating period is included in the item of area information allows an appliance, other than that capable of collecting the items of terminal location information, to adjust the time period thereof. This other appliance can for example be the appliance capable of applying a session-processing rule to the terminals.

According to one aspect of the method for transmitting a presence map, the prior step of obtaining an item of area information is followed by a step of removing from the presence map the location area identifiers absent from the item of area information, and the corresponding terminal identifiers present in these areas.

When an item of area information is received, a presence map can already exist and contain items of terminal location information related to location areas that had been included in a previous version of the item of area information, but which are no longer included in the new item of area information. Advantageously, by removing from the presence map this information which is no longer relevant, the volume of the presence map is decreased, which results in a decrease in the signaling related to the changes of location of the terminals in the network. This also results in a decrease in the computation needed for the processing of the presence map by the appliance that receives it.

According to one aspect of the invention, the presence map comprises a list of pairs {identifier of a location area; list of terminal identifiers present in this area}.

It can be seen that with this particular format the presence map comprises at least as many fields as there are special areas, but does not replicate the area fields when several terminals are found there. This format is particularly adapted for optimizing the size of the presence map when a large number of terminals are found in one and the same special area.

According to one aspect of the invention, the presence map comprises a list of pairs {identifier of a location area; identifier of a terminal present in this area}.

It can be seen that with this format variant, the presence map comprises at least as many fields as the double of the number of terminals present in one of the special areas, but contains no field corresponding to a special area in which no terminal is found. This format variant is adapted for optimizing the size of the presence map when there are few or no terminals found in the special areas.

The invention also relates to a method for applying a session-processing rule to at least one mobile terminal connected to a mobile network covering a plurality of location areas, comprising a prior step of obtaining a set of session-processing rules associated with a sub-set of the plurality of areas, the method comprising:

a prior step of sending an item of so-called area information, comprising at least one item of information related to the existence of at least one area among the plurality of location areas, called a special area, with which a special session-processing rule is associated,
 a step of obtaining a terminal presence map, associating location area identifiers with terminal identifiers,
 when at least one terminal identifier is included in the presence map, the following steps:
  identifying the session-processing rule associated with the terminal location area as indicated in the presence map,
  obtaining a session-processing rule previously applied to said at least one terminal, and
  comparing the two rules,
 when the identified rule and the previously applied rule are different, a step of applying the identified rule to said at least one terminal.

The location of a terminal is one of the criteria determining the session-processing rule from which it can benefit. According to the 3GPP standards from Version 8 onwards, these criteria are described by "PCC rules" (Policy and Charging Control rules), which are rules for applying a session-processing policy, comprising quality of service parameters and charging rules, to be applied for a stream or for a set of streams of packets. The set of the special session-processing rules designates a set of "PCC rules" accompanied by an indication of the location area or areas for which each of the "PCC rules" applies. Depending on parameters specific to the terminal such as the subscriber profile and the service requested, there also exists a "by default" rule, applicable to location areas, called "ordinary" location areas, with which no special rule is associated.

The item of area information comprises a list of the areas for which one or more special session-processing rules exist. These areas are called special. For ordinary areas that are not special areas, the "default" session-processing rule exists. In response to the sending of the item of area information, a presence map is obtained periodically. The presence map indicates which terminals are present in each of the special areas, but does not indicate the terminals present in an ordinary area.

For each of the terminals indicated by the presence map, the special session-processing rule to be applied is identified on the basis of its location area, also indicated by the presence map. In certain cases, the identified rule can be the same as the one that was previously applied: this is for example the case if the terminal was already in its special area at the time of an application of a session-processing rule having taken place previously. This is also the case if the terminal was found in another area with which the same special session-processing rule is associated. In these cases, no new application of a session-processing rule is necessary. It is only when they are different that application of a special session processing rule, according to the identifier rule, is necessary.

In other cases, the presence map can be void, thereby indicating that no terminal is found in a special area, in which case no terminal has to have a special session-processing rule applied to it.

The method thus makes it possible to apply a special session-processing rule to terminals found in special areas, and only to these terminals, while avoiding re-applying the same rule to the same terminals each time that a terminal presence map is obtained.

This method for applying a session-processing rule can be implemented by an appliance of the mobile network capable of managing the application of a session-processing rule to the terminals, such as a PCRF (Policy and Charging Rules Function) management appliance. The item of area information and the presence map can be exchanged between the PCRF and the GMLC over a new LCS (Location Control Service) client/server interface according to the OMA (Open Mobile Alliance) standard, the PCRF taking the role of LCS client.

According to one aspect of the method for applying a session-processing rule, the previously applied session-processing rule is identified by searching, in another previously obtained presence map, for the identifier of the at least one terminal and its location area, then by identifying the rule corresponding to this location area.

By comparing two presence maps obtained at two different periods, it is possible to deduce the exact movements of certain terminals in the time interval between these two instants, which is necessary in certain scenarios.

For example, when a terminal leaves a special area for another special area endowed with the same session-processing rule, it does indeed appear in both maps, but a change of rule is not then necessary.

Using the comparison between the two presence maps, it is possible to apply a session-processing rule according to a special rule in all cases where it is necessary, and to never do it when it is not necessary.

According to one aspect of the method for applying a session-processing rule, the step of obtaining the terminal presence map is followed by a step of applying a session-processing rule to the at least one terminal according to a predetermined rule, when an identifier of the terminal is included in a previously obtained presence map, and is not included in the presence map.

When a terminal leaves a special area for an ordinary area, it appears in a first presence map and no longer appears in the most recent, but a change of rule is indeed necessary.

By examining the terminal identifiers included in a previously obtained presence map, it is possible to stop applying a special session-processing rule to a terminal that is no longer in a special area. In this case, the rule applied to the terminal is applied according to the "default" session-processing rule, applicable to the ordinary location areas.

The invention relates to a device for transmitting a presence map of mobile terminals connected to a mobile network covering a plurality of location areas, implemented by an appliance of the mobile network capable of collecting items of information about the location of mobile terminals, the device comprising:

means for prior obtaining of an item of so-called item of area information, comprising at least one item of information related to the existence of at least one area among the plurality of location areas, called a special area, with which a special session-processing rule is associated, means for iteratively updating a presence map associating the location area identifiers with terminal identifiers, the means comprising the following means:
  collecting an item of terminal location information, comprising a location area identifier of this terminal,
  searching, in the item of area information, to find out whether or not a special area exists corresponding to the identifier of said location area, and
  when the special area exists, adding the identifier of the terminal and the identifier of the location area to the terminal presence map,
and means for transmitting the terminal presence map to a mobile network appliance capable of applying a session-processing rule to a terminal according to at least its location area.

The invention also relates to a device for applying a session-processing rule to at least one mobile terminal connected to a mobile network covering a plurality of location areas, comprising means for the prior obtaining of a set of session-processing rules associated with a sub-set of the plurality of areas, the device comprising:
  means for prior sending of an item of so-called area information, comprising at least one item of information related to the existence of at least one area among the plurality of location areas, called a special area, with which a special session-processing rule is associated,
  means for obtaining a terminal presence map, associating location area identifiers with terminal identifiers,
  when at least one terminal identifier is included in the presence map, the following means:
    identifying the session-processing rule associated with the location area of the terminal as indicated in the presence map,
    obtaining a session-processing rule previously applied to said at least one terminal, and
    comparing the two rules,
  when the identified rule and the previously applied rule are different, means for applying the identified rule to said at least one terminal.

The invention relates to an appliance of a communication network, capable of collecting items of information about the locations of mobile terminals, comprising a device for transmitting a presence map.

The invention also relates to an appliance of a communication network, capable of applying a session-processing rule to a terminal according to its location area and at least one rule, comprising a device for applying a session-processing rule.

The invention relates to a system for signaling the presence of terminals comprising: an appliance comprising a device for applying a session-processing rule, and at least one appliance comprising a device for transmitting a presence map.

The invention relates to a signal carrying a message, the message comprising an item of information, called an item of area information, comprising at least one item of information related to the existence of at least one location area of mobile terminals, called a special area, in which a special session-processing rule is associated with the mobile terminals, and in that it is sent from an appliance capable of applying a session-processing rule to a mobile terminal according to its location area and at least one rule, intended for an appliance capable of collecting items of information about the location of mobile terminals.

The invention also relates to a signal carrying a message, the message comprising a presence map of mobile terminals, associating location area identifiers with mobile terminal identifiers, and in that it is sent from an appliance capable of collecting items of information about the location of mobile terminals, intended for an appliance capable of applying a session-processing rule to a mobile terminal according to its location area and at least one rule.

The invention relates to a computer program comprising instructions for the implementation of a method for transmitting a presence map, when this program is executed by a processor.

The invention finally relates to a computer program comprising instructions for the implementation of a method for applying a session-processing rule, when this program is executed by a processor.

These programs, stored on a medium readable by a computer, can use any programming language, and be in the form of source code, object code, intermediate code between source code and object code, such as in a partly compiled form, or in any other form that may be desired.

5. PRESENTATION OF THE FIGURES

Figure 2:
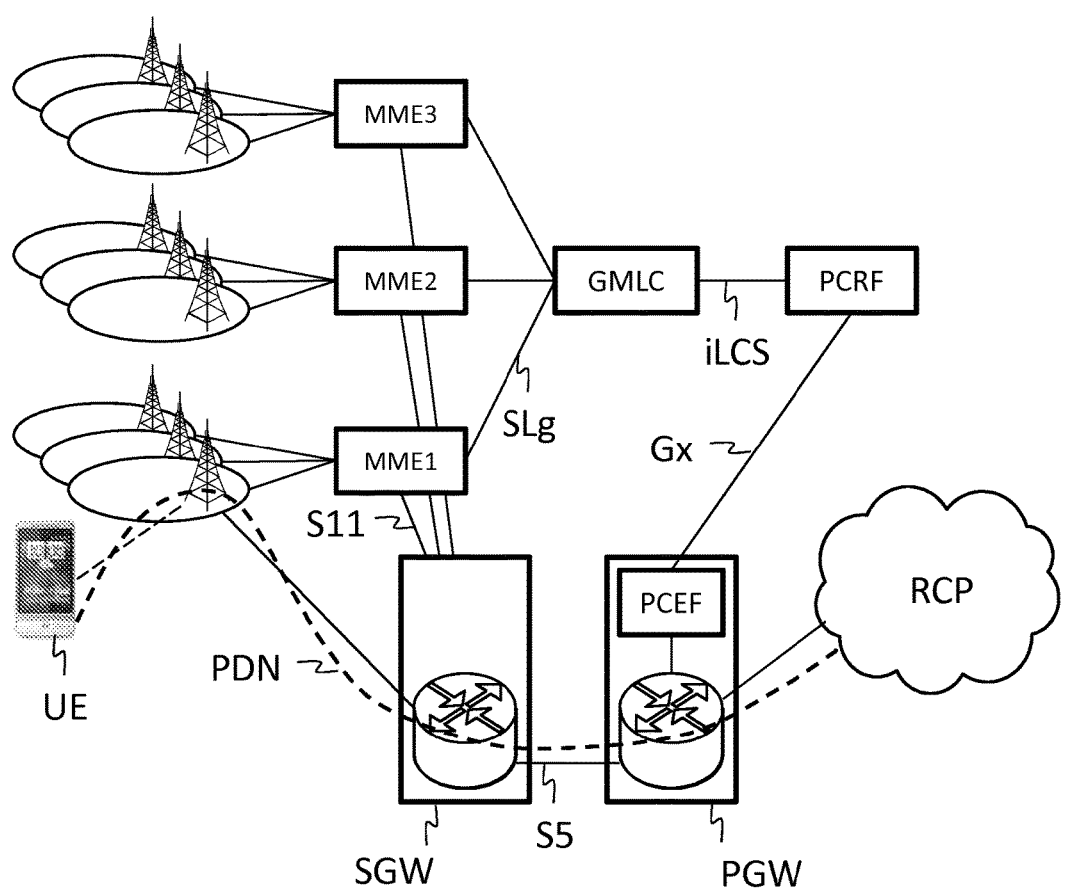
Figure 3:
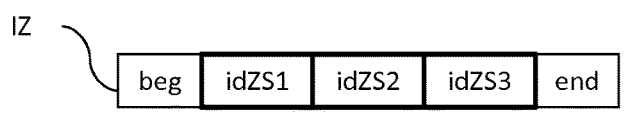
Figure 4:
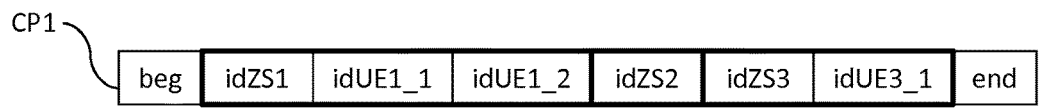
Figure 5:
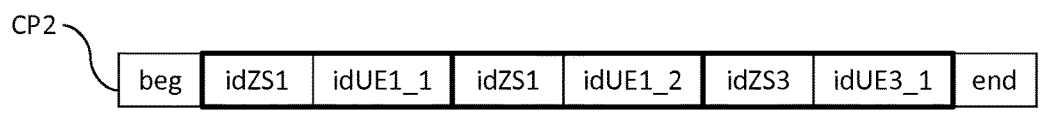
Figure 6:
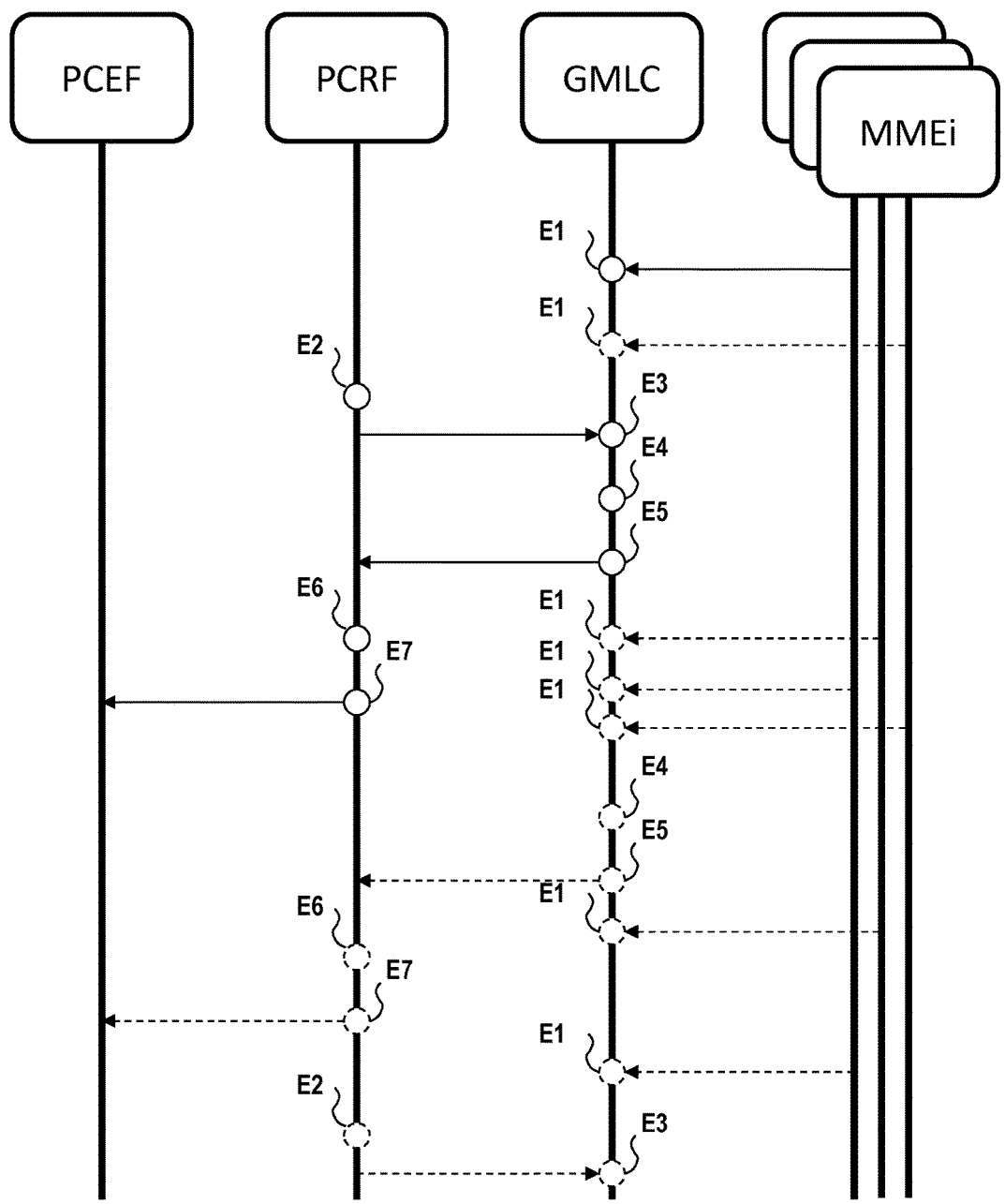
Figure 7:
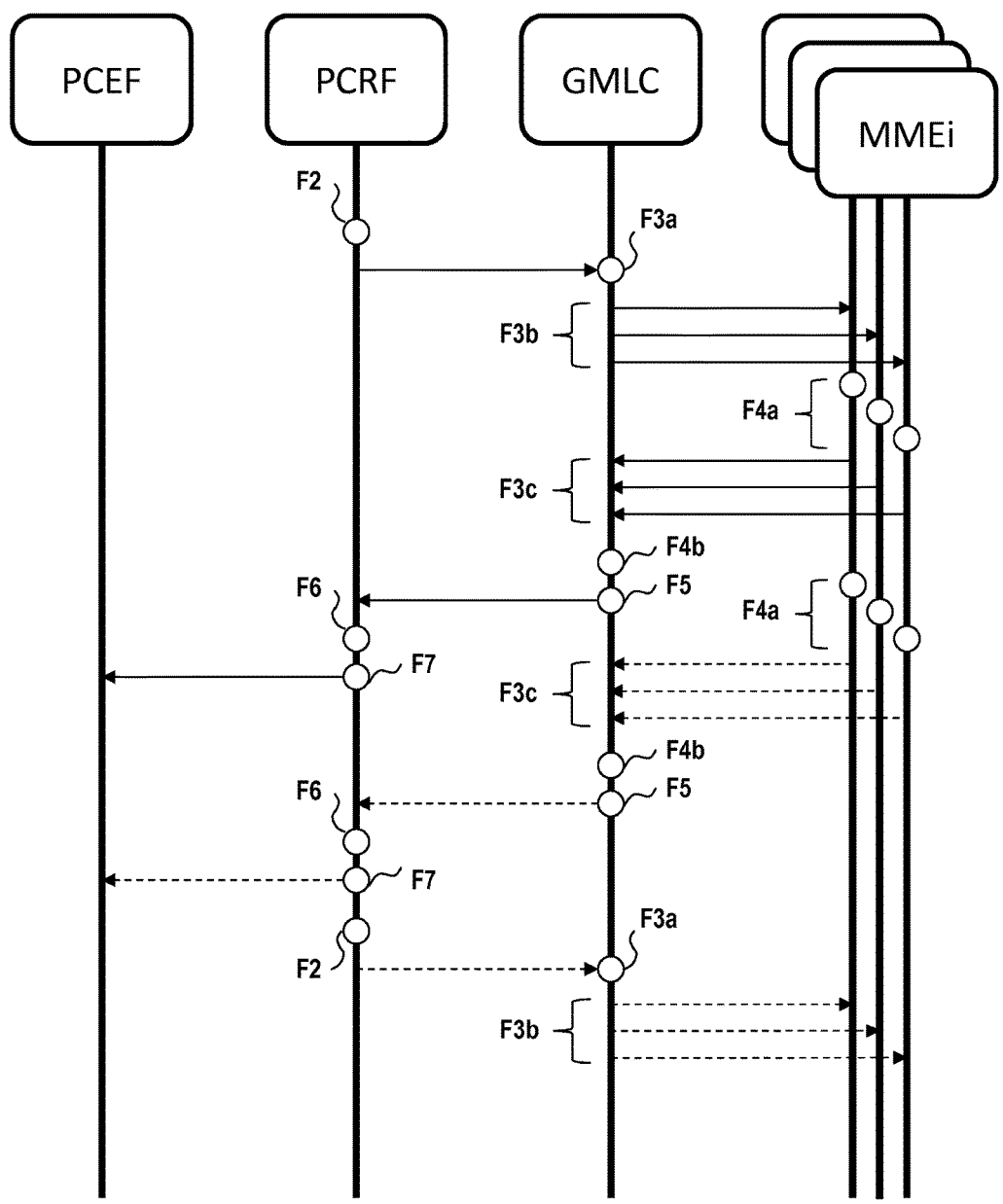
Figure 8:
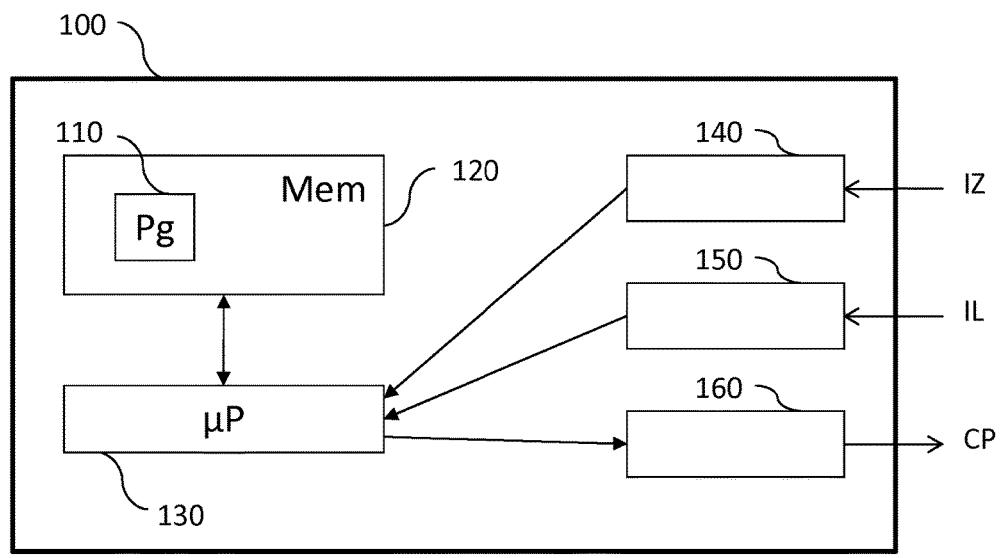
Figure 9:
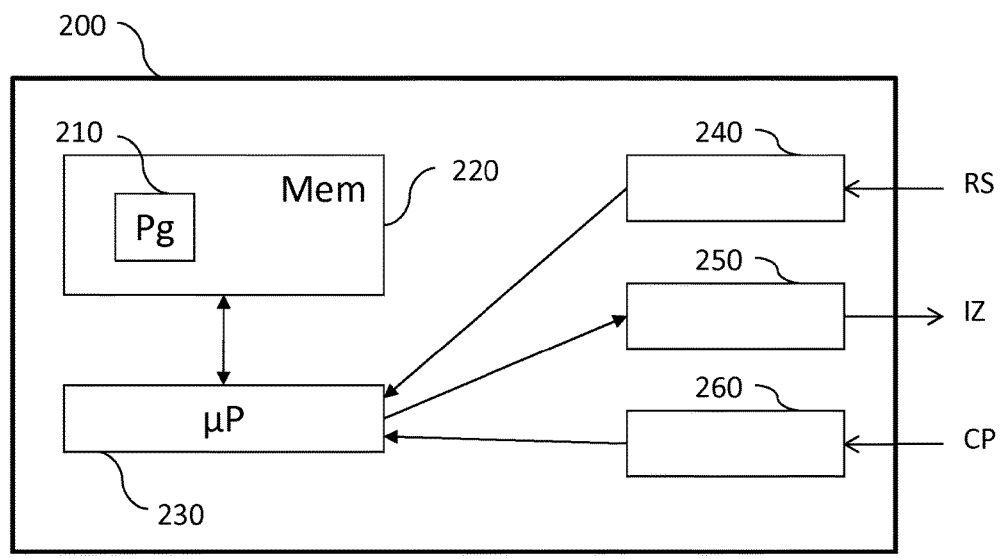

Other advantages and features of the invention will become more clearly apparent upon reading the following description of a particular embodiment of the invention, given by way of a simple illustrative and non-limiting example, and the appended drawings, among which:

FIG. 1 presents the architecture of a mobile network of the prior art,

FIG. 2 presents the architecture of a mobile network according to the invention, FIG. 3 presents the structure of an item of area information according to the invention, FIG. 4 presents the structure of a presence map according to the invention, FIG. 5 presents a variant of the structure of a presence map according to the invention, FIG. 6 presents the method for transmitting a presence map of mobile terminals and the method for applying a session-processing rule to at least one mobile terminal, according to a first embodiment of the invention, FIG. 7 presents the method for transmitting a presence map of mobile terminals and the method for applying a session-processing rule to at least one mobile terminal, according to a second embodiment of the invention, FIG. 8 presents the structure of a device for transmitting a presence map according to the invention, FIG. 9 presents the structure of a device for applying a session-processing rule according to the invention.

6. DETAILED DESCRIPTION OF AT LEAST ONE EMBODIMENT OF THE INVENTION

In the rest of the description, by way of exemplary embodiment of the invention we will consider an EPC (Evolved Packet Core) network according to the 3GPP standards from Version 8 onwards. Of course, the invention can be produced in the context of other standards.

FIG. 1 presents the architecture of a mobile network of the prior art.

The managing appliance PCRF (PCRFaa) collects from several sources items of information linked to the networks (type of radio access, gateway addresses, location of the client terminal, etc.), information linked to the client subscription, and information linked to the applications used by the client on his or her terminal (type of application, type of medium, etc.).

The managing appliances MME (MMEaa1, MMEaa2 and MMEaa3) are entities of the monitoring plane (signaling) of the network whose aim is to manage the mobility procedures (signaling between the nodes of the core network for mobility) in a certain number of location areas.

The SGW (Serving Gateway) ensures among other things the anchoring of the medium when the UE (User Equipment) terminal changes radio access point in the course of a session, functions for charging and buffering the medium intended for the final user when radio connectivity has not yet been set up or has been interrupted. Several SGW can be managed by one MMEaa.

The PGW (Packet Data Network Gateway) sets up the PDN (Packet Data Network) connection between the UE terminal and the packet switching network RCP by providing IP (Internet Protocol) connectivity to the final users (attribution of IP address). It has an on-board PCEF (Policy and Charging Enforcement Function) whose role is to ensure the functions of charging and applying advanced quality of service policies, under the monitoring of the PCRFaa. One PGW is connected to several SGWs.

During the procedure for opening an IP connectivity session ("IP CAN session") carried by the PDN connection, the PCEF opens an associated command session to the PCRFaa and communicates thereto information associated with this connectivity session (for example the type of radio access). According to these features and other items of information originating from several other sources, the PCRFaa determines the policy (quality of service, charging system to be implemented, access authorization) to be applied for the various services transported by the IP connectivity session in progress. This policy can be modified if events that are parameterizable by the operator occur during the session, for example if the location of the UE terminal changes.

When this location changes, the signaling messages exchanged across the interfaces S11 and S5 between, in order, the MMEaa, the SGW and the PGW for the management of the connectivity session (creation, modification, closure) indicate the location of the user according to the level of granularity required. Thus, the PCEF can upload the change of location of the user to the PCRFaa in real time via the monitoring session associated with the connectivity session and the Gx interface. The PCRFaa can then, depending on its configuration, decide on a Quality of Service (e.g. bandwidth) or charging modification according to the location of the user.

In addition to the entities mentioned above, the specification TS 23.271 of the 3GPP standard specifies a central appliance for locating mobile terminals GMLCaa, which is an entity having access to all the MMEaa entities by way of SLg interfaces. The GMLCaa has the function of recovering the location information items of the users in real time from the various MMEaa instantiations in the operator network. Despite the GMLCaa, the PCRFaa must obtain the necessary items of information from the various MMEaa entities, indirectly by going through the appliances of the transfer plane such as the PGWs and SGWs.

FIG. 2 presents the architecture of a mobile network according to the invention.

According to the invention, the PCRF can collect directly from the GMLC the location information it needs via an iLCS interface called client/server LCS (Location Control Service), taking the role of the LCS client. The polling of a GMLC, or of an MME, can be done on the basis of one area or of a group of areas in order to obtain in return a list of the terminals present in this area or in each of the areas of this group. The area identifiers used in the polling can be of any type, including LAI (Location Area Identity) or TAI (Tracking Area Identity).

Hereinafter, the term "item of area information" denotes the group of areas from which the PCRF polls the GMLC, and the term "presence map" denotes the list obtained in response by the PCRF.

This new mode of polling of the GMLC or of the MME enables or facilitates various location-dependent applications, which can be impossible or harder to implement in the prior art. In addition to making it possible to manage more finely the application of a session-processing rule to the terminals, it allows, for example, the sending of advertising messages of SMS (short messaging service) type from local businesses. Other examples of applications are, in the case of congestion in a location area, the reduction of the bandwidth of the terminals found in this area, or else, in the case of an unforeseen event (accident, attack) in one area, the warning by SMS of the users of the neighboring areas, to prevent them from entering the affected area and thus assist the public safety services.

FIG. 3 presents the structure of an item of area information according to the invention. In this example, three areas are concerned, the areas whose identifiers are idZS1, idZS2 and idSZ3. The item of area information comprises at least three fields each containing the identifier of one area. The fields beg and end, for example, make it possible to identify that the structure is that of an item of area information, and that the number of area identifiers is three, and to check the absence of decoding error on receiving the item of area information.

It can be seen that the item of area information does not contain any field related to a session-processing rule, because according to the invention, only the PCRF must be capable of distinguishing between the rules. For an appliance receiving the item of area information from the PCRF, such as the GMLC, it is only necessary to identify with which areas a rule is associated, whatever the rule. The structure of the item of area information therefore advantageously makes use of this property to reduce to a minimum the size of the item of area information as well as the complexity of the method for processing the item of area information.

FIG. 4 presents the structure of a presence map according to the invention. This structure indicates, for each of the areas of the item of area information, a list of the terminals that it contains. The figure illustrates the example in which two terminals, whose identifiers are idUE1_1 and idUE1_2, are found in the idZS1 area, no terminal is found in the idZS2 area, and one terminal, whose identifier is idUE3_1, is found in the idZS3 area. The fields beg and end have the same function as in the structure of an item of area information.

It can be seen that with this structure the presence map comprises at least as many fields as there exist areas in the item of area information, but does not replicate the area fields when several terminals are found there. This structure is particularly advantageous when a large number of terminals are found in each of the areas.

FIG. 5 presents a variant of the structure of a presence map according to the invention. In this variant, the structure indicates, for each of the terminals present in one of the areas of the item of area information, the pair {area; terminal}. The figure illustrates the same example as for FIG. 4. The fields beg and end have the same function as in the structure of an item of area information.

It can be seen that with this variant, the presence map comprises at least as many fields as the double of the number of terminals present in one of the areas of the item of area information, but does not contain any field corresponding to an area of the item of area information that is without a terminal. This variant of the structure is advantageous when the areas of the item of area information only contain a few, or no, terminals.

FIG. 6 presents the method for transmitting a presence map of mobile terminals and the method for applying a session-processing rule to at least one mobile terminal, according to a first embodiment of the invention. According to this embodiment, the method for transmitting a presence map is implemented by the GMLC management appliance, and the method for applying a session-processing rule is implemented by the PCRF management appliance.

In this embodiment, the supervision of the changes of location of the terminals is carried out globally by the GMLC for all terminals at once. The GMLC sends a presence map of the terminals to the PCRF at regular intervals, which makes it possible to reduce the signaling linked to the changes of location of the terminals, between the GMLC and the PCRF.

It can be necessary, in a step E0, not illustrated in the figure, for the MMEi's to be pre-configured to transmit the items of location information to the GMLC.

In a step E1, the GMLC obtains from one of the MMEi's that it manages an item of information about the location of a terminal. This step occurs repeatedly and at a high but random frequency, in the order of several tens, hundreds or thousands of times per second according to the size of the network, according to the movements of the terminals in the location areas managed by the MMEi's. The first instantiation of this step is illustrated using a bold line in the figure, the others using a dotted line.

The message of the step E1 can take the form of a message of "subscriber location report" type according to the 3GPP TS 29.172 standard, the receipt of which can be acknowledged by a message of "subscriber location report ack" type, not represented in the figure, according to the same standard.

In a step E2, the PCRF determines the item of area information, which is a list of special location areas that must undergo special processing, then, in a step E3, the GMLC obtains this item of area information from the PCRF.

The special processing is for example a drop in the pricing, or an increase in the bandwidth, for each of the terminals found in one of the areas of the special list. The concerned areas and the associated special processings are determined by the commercial policy of the network operator. The list can contain all the areas, a single area, several areas or none of the location areas of the operator. The step E2 of determining the list of special areas and the step E3 of obtaining this list therefore take place repeatedly but not necessarily regularly, for example each time that the commercial policy of the operator changes, in the order of once or twice a day. The first instantiation of these steps is illustrated using a bold line in the figure, the others using a dotted line.

The message in step E3 can take the form of a message of "triggered location reporting request" type according to a modification of the OMA MLP (Open Mobile Alliance; Mobile Location Protocol) standard. This modification allows a PCRF to "subscribe" to a GMLC in order to receive at regular time intervals the list of terminals present in a list of areas transmitted in the message. The area identifiers used in the item of area information can use a different numbering system from that of the items of location information. For example, the area identifiers used in the item of area information are LAIs or TAIs, and the identifiers used in the items of location information that the GMLC receives are Cell Ids. In this case the GMLC must proceed with a translation between LAI/TAI and Cell Id.

In a step E4, using the items of location information received in step E1 and the item of area information received in a step E3, the GMLC determines the presence map of the terminals, i.e. the list of the terminal found at the time of this step in any special area of the item of area information received from the PCRF in the step E3.

In a step E5, the GMLC sends the presence map of the terminals to the PCRF.

The message in the step E5 can take the form of a message of "triggered location report" type according to a modification of the OMA MLP standard.

In a step E6, using the terminal presence map sent by the GMLC, and by comparing it where applicable to a previous version of the map, the PCRF selects the terminals whose session-processing rule as applied must be changed (processing of the quality of service, charging), either because they have entered one of the areas of the special list, or because they have left one of them.

In a step E7, the PCRF transmits to the PCEF new parameters associated with the session-processing rule to be applied to the concerned terminals, so that the session-processing rules applied do indeed correspond to the new locations of the terminals.

The steps E4 of determining the terminal presence map, E5 of sending the map, E6 of selecting the terminals, and E7 of transmitting new parameters, can be regularly repeated at a frequency in the order of the second, in order to allow the PCRF to apply the commercial policy of the operator with an accuracy approaching the second. The first instantiation of these steps is illustrated using a bold line in the figure, the others using a dotted line.

FIG. 7 presents the method for transmitting a presence map of mobile terminals and the method for applying a session-processing rule to at least one mobile terminal, according to a second embodiment of the invention. According to this embodiment, the method for transmitting a presence map is implemented by MMEi appliances, and the method for applying a session-processing rule is implemented by the PCRF management appliance.

Unlike the first embodiment, in this second embodiment the GMLC shares with the MMEi's the task of supervising the changes in location of the terminals. The GMLC transfers the list of special areas to the MMEi's. The MMEi's, each covering one group of areas, each return a terminal presence map to the GMLC. The GMLC transfers the terminal presence maps to the PCRF, separately or merged into a single map. This not only allows a reduction in the signaling linked to the changes of location of the terminals between the GMLC and the PCRF, but also between the MMEi's and the GMLC.

In steps F1 not illustrated in the figure, the MMEi's receive an item of terminal location information. These steps occur repeatedly and at a high but random frequency, in the order of several tens, hundreds or thousands of times per second according to the size of the network, according to the movements of the terminals in the location areas managed by the MMEi's.

In a step F2 identical to the step E2 of the first embodiment, the PCRF determines the item of area information, which is a list of special location areas that must undergo special processing, then, in a step F3a identical to the step E3 of the first embodiment, the GMLC obtains this item of area information from the PCRF.

In a step F3b, the GMLC transmits the list of special areas included in the item of area information to each of the MMEi's that it manages.

The messages of the step F3b can take the form of messages of "subscriber location subscription" type according to a modification of the 3GPP TS 29.172 standard. This modification entails the addition of a new type of message between GMLC and MMEi allowing a GMLC to "subscribe" to an MMEi in order to receive at regular time intervals the list of terminals present in a list of areas transmitted in the message. The area identifiers used in the item of area information can use a different numbering system from that of the items of location information. For example the area identifiers used in the item of area information are LAIs or TAIs, and the identifiers used in the location information items that are received by the MMEi's are Cell Ids. In this case the MMEi's must proceed with a translation between LAI/TAI and Cell Id.

The step F2 of determining the list of special areas, the step F3a of obtaining this list and the step F3b of transmitting this list take place repeatedly but not necessarily regularly, for example each time that the commercial policy of the operator changes, in the order of once or twice a day. The first instantiation of these steps is illustrated using a bold line in the figure, the others using a dotted line.

In a step F4a, using the items of location information received in the steps F1 and the item of area information received in a step F3b, each of the MMEi's determines its terminal presence map, i.e. the list of the terminals found at the time of this step in any special area that is covered by this MMEi.

In a step F3c, the GMLC receives from each of the MMEi's a terminal presence map.

The messages in the step F3c can take the form of messages of "subscriber location report" type according to a modification of the 3GPP TS 29.172 standard, making it possible to convey a list of pairs {terminal; location area}, rather than a single pair. The receiving of the messages of the step F3c by the GMLC can be acknowledged by messages of the "subscriber location report ack" type, not represented in the figure, according to the same standard.

In a step F4b, the GMLC merges the terminal presence maps received from the MMEi's into a single map, representing the list of the terminals present in all the special areas included in the last item of area information received from the PCRF in the step F3a.

The steps F5, F6 and F7 are identical to the steps E5, E6 and E7 of the first embodiment respectively.

The steps F4a of determining the terminal presence maps, F3c of obtaining the presence maps, F4b of merging the presence maps into a single map, F5 of sending this map, F6 of selecting terminals, and F7 of transmitting new parameters, can be repeated regularly at a frequency in the order of the second, in order to allow the PCRF to apply the commercial policy of network operator with an accuracy approaching the second. The first instantiation of these steps is illustrated using a bold line in the figure, the others using a dotted line.

In a non-illustrated variant of the steps F4b and F5, the GMLC does not merge the presence maps, but sends them one by one, observing the format expected by the PCRF.

In relation to FIG. 8, the structure of a device 100 for transmitting a presence map according to the invention will now be described.

Such a device 100 comprises:
  a receiving module 140, capable of receiving an item of area information (IZ), representative of an identifier of a special location area,
  a receiving module 150, capable of receiving an item of information about the location of a terminal (IL), comprising an identifier of a location area,
  a sending module 160, capable of sending a terminal presence map (CP), representative of a terminal identifier, and for said at least one item of terminal identifier information, an item of identifier information about a location area in which the terminal is found.

The item of area information and the item of terminal location information are processed by a processing unit 130 equipped with a microprocessor capable of implementing the means making up the invention as described previously, in particular, the means for searching for a location area in the item of area information, and of updating the presence map.

The device 100 according to the invention furthermore comprises a memory 120 in which a computer program 110 implementing the steps of the method for transmitting a presence map is stored. At set-up, the code instructions of the computer program 110 are for example loaded into a RAM memory, before being executed by the processor of the processing unit 130.

In relation to FIG. 9, the structure of a device 200 for applying a session-processing rule according to the invention will now be presented.

Such a device 200 comprises:
  a receiving module 240, capable of receiving at least one special session-processing rule associated with at least one location area (RA),
  a sending module 250, capable of sending an item of area information (IZ), representative of an identifier of a special location area,
  a receiving module 260, capable of receiving a terminal presence map (CP), representative of a terminal identifier, and for said at least one item of terminal identifier information, an item of identifier information about the location area in which the terminal is found.

The special session-processing rule and the presence map are processed by a processing unit 230 equipped with a microprocessor capable of implementing the means making up the invention as described previously, in particular, the means for identifying the session-processing rule on the basis of a location area identifier, means for comparing rules with each other, and means for applying a session-processing rule according to a rule.

The device 200 according to the invention furthermore comprises a memory 220 in which a computer program 210 implementing the steps of the method for applying a session-processing rule is stored. At set-up, the code instructions of the computer program 210 are for example loaded into a RAM memory, before being executed by the processor of the processing unit 230.

The exemplary embodiments of the invention that have just been presented are only a few of the embodiments that may be envisioned. They show that the invention makes it possible to correlate the signaling related to the changes of location of the terminals with the need to change the session-processing rule that is applied to them, and thus to strongly decrease the volume of signaling generated in relation to the changes of location of the terminals.

The invention claimed is:

1. A method for transmitting a presence map of mobile terminals connected by a communication session to a mobile network covering a plurality of location areas, implemented by an appliance of the mobile network capable of collecting items of information about the location of mobile terminals, wherein the method comprises:

a prior step of obtaining an item of so-called area information, comprising at least one identifier of an area among the plurality of location areas, called a special area, with which a special quality of service or charge is associated, the special quality of service or charge being applied to all terminals present in the special area, at least one iterative step of updating a terminal presence map associating location area identifiers with terminal identifiers, the step comprising the following steps:

collecting an item of terminal location information, comprising a location area identifier of this terminal, searching, in the item of area information, for the identifier of a special area corresponding to the identifier of said location area, said identifier of a special area having been obtained prior to the first iteration of updating, and, when the special area identifier is found, adding the terminal identifier and the location area identifier to the terminal presence map, and a step of transmitting the terminal presence map to an appliance of the mobile network capable of applying a quality of service or charge to a terminal according to at least its location area, wherein transmitting the presence map is periodic, the duration of the period being included in the item of area information.

2. The method for transmitting a presence map as claimed in claim 1, wherein the first step of collecting an item of terminal location information within the iterative step is preceded by a step of sending a request to subscribe to the items of terminal location information.

3. The method for transmitting a presence map as claimed in claim 1, wherein the prior step of obtaining an item of area information is followed by a step of removing from the presence map the location area identifiers absent from the item of area information, and the corresponding terminal identifiers present in these areas.

4. The method for transmitting a presence map as claimed in claim 1, wherein the step of transmitting the terminal presence map to an appliance of the mobile network comprises transmitting the terminal presence map to a Policy and Charging Rules Function (PCRF) management appliance of the mobile network.

5. A method for applying a quality of service or charge to at least one mobile terminal connected by a communication session to a mobile network covering a plurality of location areas, wherein the method is implemented by a management appliance of the mobile network capable of collecting items of information about the location of mobile terminals, and comprises:

a prior step of the management appliance obtaining a set of quality of service or charging rules, including special quality of service or charge associated with a sub-set of the plurality of areas, called special areas, a special quality of service or charge being applicable to all terminals present in a special area, a prior step of the management appliance sending an item of so-called area information, comprising at least one identifier of a special area and a period of transmission of a terminal presence map, a step of the management appliance obtaining the terminal presence map, associating location area identifiers with terminal identifiers, wherein the terminal presence map is obtained periodically according to the period, when at least one terminal identifier is included in the presence map, the following steps by the management appliance:

identifying the special quality of service or charge associated with the terminal location area as indicated in the presence map, obtaining a quality of service or charge previously applied to said at least one terminal, and comparing the two quality of services or charges, when the identified special quality of service or charge and the previously applied quality of service or charge are different, a step of the management appliance applying the identified special quality of service or charge to said at least one terminal.

6. The method for applying a quality of service or charge as claimed in claim 5, wherein the previously applied quality of service or charge is identified by searching, in another previously obtained presence map, for the identifier of the at least one terminal and its location area, then by identifying the rule corresponding to this location area.

7. The method for applying a quality of service or charge as claimed in claim 5, wherein the step of obtaining the terminal presence map is followed by a step of applying a quality of service or charge to the at least one terminal according to a predetermined rule, when an identifier of the terminal is included in a previously obtained presence map and is not included in the presence map.

8. A device for transmitting a presence map of mobile terminals connected by a communication session to a mobile network covering a plurality of location areas, implemented by an appliance of the mobile network capable of collecting items of information about the location of mobile terminals, the device comprising:

a non-transitory computer-readable medium comprising instructions stored thereon; and a processor configured by the instructions to perform acts comprising:

a prior act of obtaining of an item of so-called area information, comprising at least one identifier of an area among the plurality of location areas, called a special area, with which a special quality of service or charge is associated, the special quality of service or charge being applicable to all terminals present in the special area, iteratively updating a presence map associating location area identifiers to terminal identifiers, the iteratively updating comprising:

collecting an item of terminal location information, comprising a location area identifier of this terminal, searching, in the item of area information, to find out whether or not an identifier of a special area corresponds to the identifier of said location area, said identifier of a special area having been obtained prior to the first iteration of updating, and, when the identifier of a special area corresponds to the identifier of said location area, adding the identifier of the terminal and the identifier of the location area to the terminal presence map, and transmitting the terminal presence map to a mobile network appliance capable of applying a quality of service or charge to a terminal according to at least its location area, wherein transmitting the presence map is periodic, the duration of the period being included in the item of area information.

9. A device for applying a quality of service or charge to at least one mobile terminal connected by a communication session to a mobile network covering a plurality of location areas, comprising:
- a non-transitory computer-readable medium comprising instructions stored thereon; and
- a processor configured by the instructions to perform acts comprising:
  - a prior act of obtaining of a set of quality of service or charging rules, including special quality of service or charge associated with a sub-set of the plurality of areas, called special areas, a special quality of service or charge being applicable to all terminals present in a special area,
  - a prior act of sending an item of so-called area information, comprising at least one identifier of a special area and a period of transmission of a terminal presence map,
  - obtaining the terminal presence map, associating location area identifiers with terminal identifiers, wherein the terminal presence map is obtained periodically according to the period,
  - performing the following acts when at least one terminal identifier is included in the presence map:
    - identifying the special quality of service or charge associated with the location area of the terminal as indicated in the presence map,
    - obtaining a quality of service or charge previously applied to said at least one terminal, and
    - comparing the two rules,
  - when the identified special quality of service or charge and the previously applied quality of service or charge are different, applying the identified special quality of service or charge to said at least one terminal.

* * * * *